United States Patent [19] [11] Patent Number: 4,857,422
Stocchiero [45] Date of Patent: Aug. 15, 1989

[54] LID FOR ACCUMULATOR BATTERIES WITH AN INCORPORATED HANDLE

[76] Inventor: Olimpio Stocchiero, 5 Via Kennedy, 36050 Montorso Vicentino (VI), Italy

[21] Appl. No.: 292,534

[22] Filed: Dec. 30, 1988

[30] Foreign Application Priority Data

Jan. 11, 1983 [IT] Italy .................. 85502 A/88

[51] Int. Cl.⁴ .......................................... H01M 2/04
[52] U.S. Cl. ................................. 429/175; 429/187
[58] Field of Search ............... 429/175, 187, 122, 178; 16/DIG. 15

[56] References Cited

U.S. PATENT DOCUMENTS 3,457,119  7/1969  Tench ............................... 429/187
3,871,924  3/1975  De Mattie et al. ............. 429/187 X
3,910,800 10/1975  Groby et al. .................... 429/187
4,526,128 12/1985  Humphreys et al. ........... 429/178
4,808,495  2/1989  Goldstein ........................ 429/175

Primary Examiner—Anthony Skapars
Attorney, Agent, or Firm—Birch, Stewart, Kolasch & Birch

[57] ABSTRACT

According to the invention a lid for accumulator batteries made of plastic material comprises at least two parallelepiped elements obtained while moulding the lid, having the same height and being arranged parallel to each other along the longer sides of the battery, each of said elements being connected with the other by at least a transverse piece, which is also obtained while moulding the lid and which functions as a handle.

According to this construction, the parallelepiped elements of the lid form a horizontal surface which allows to stack the batteries; moreover an equal volume for each cell constituting the battery is insured and the battery can easily be lifted and transported thanks to a handle which is part of the lid.

2 Claims, 2 Drawing Sheets

LID FOR ACCUMULATOR BATTERIES WITH AN INCORPORATED HANDLE

The invention concerns a lid for accumulator batteries with one or more incorporated handles.

It is a known fact that accumulator batteries, particularly the ones which are used for cars, having electric characteristics and overall dimensions which are standardized according to international rules. Moreover the batteries should not necessarily but preferably fulfil certain other requirements, such as, for instance, the possibility of stacking the batteries on top of each other for obvious storage reasons.

Another characteristic which each battery should preferably have, is that each cell constituting the battery should have an equal volume of electrolyte. This obviously arises from the fact that an equal volume of electrolyte in each cell constituting the battery would insure a uniform life-span of the battery for each cell.

Another requirement in the construction of batteries, particularly car batteries or, in any case, starter batteries, is that they be transportable and easy to handle. For this reason many manufactureres of accumulator batteries have provided them with a handle suited for transportation.

In some constructions the handle is a part added to the battery, which hooks on to the battery box through some appropriate projections. Other constructions are provided with strings which go through some appropriate holes obtained in the lid edge. Yet other constructions are provided with a stiff handle moulded in a non-revolving position on the battery box. Obviously, regardless of the geometry of the lid, in those cases where the handle is rigidly connected with the lid, the batteries can no longer be stacked. In other cases, when the handle is an element added to the battery, it may be possible to form stacks depending on the geometry of the lid, but obviously there are added costs in these constructions, due to the use of an added part and to the assembly of said part on the battery.

Finally in some constructions the lid presents some lateral impressions in the shape of a recess which make the transportation easier but force the user to always use two hands for lifting.

Since it is a known fact that all car batteries require that in the lid there must be at least one re-fill opening complete with cap for each element of the battery and two poles constituting the terminal points of the battery, it becomes obvious that the characteristics of stackability and the presence of an equal volume of electrolyte for each cell depend entirely on the geometry of the lid. Other known constructions foresee the possibility for the batteries to be stacked, but this construction sacrifices the equality of the electrolyte volume for each cell. In other constructions each cell has the same volume of electrolyte, but the stackability of the batteries is not insured because of the presence of a series of re-fill caps. The purpose of the present invention is that of overcoming the just described inconveniences. The first purpose is the creation of a battery lid presenting one or more handles incorporated in the lid itself. Another proposed purpose is that the lid provided with one or more handles be of such a shape as to allow the stackability of the batteries provided with the lid according to the invention. Yet another purpose of the invention is that the stackable lid provided with the handle be such that in each cell forming the battery an equal volume of electrolyte is guaranteed. All purposes are fulfilled by a battery lid made of plastic material which, in accordance with the patent claims, is characterized in that it comprises two parallelepiped elements being part of the lid, having an equal height and being arranged on the longer parallel sides of the battery, wherein one of said elements contains holes for the re-fill of the battery elements and wherein said parallelepiped elements are joined together by at least one transverse piece functioning as a handle.

According to the invention the shape of the lid insures, first of all, an equal volume of the electrolyte for each cell composing the battery, since the two parallelepiped elements constituting the lid are parallel with each other and are symmetrically arranged.

Moreover, the stackability of the battery is also insured, since the two parallelepiped elements of the lid are of equal height and create a flat bearing surface for the battery to be stacked. Finally one or more junction elements, which are present between the two parallelepiped elements, constitute one or more handles, suited for the lifting and the transportation of the battery. One of the advantages reached with the present invention is that the handle obtained on the lid is part of the lid itself and does not increase the overall dimensions of the battery. Another advantage consists of the fact that the handle is obtained directly during the moulding process of the lid, without any additional cost for the assembly of the handle. Moreover, the handle in itself does not constitute an added element of the battery.

Other advantages and characteristics of the invention will be better understood from the description of two preferred forms of execution, which are given by way of illustration only, but which are not meant to limit the scope of the invention and which are represented in the enclosed tables of drawing, wherein.

Figure 1:
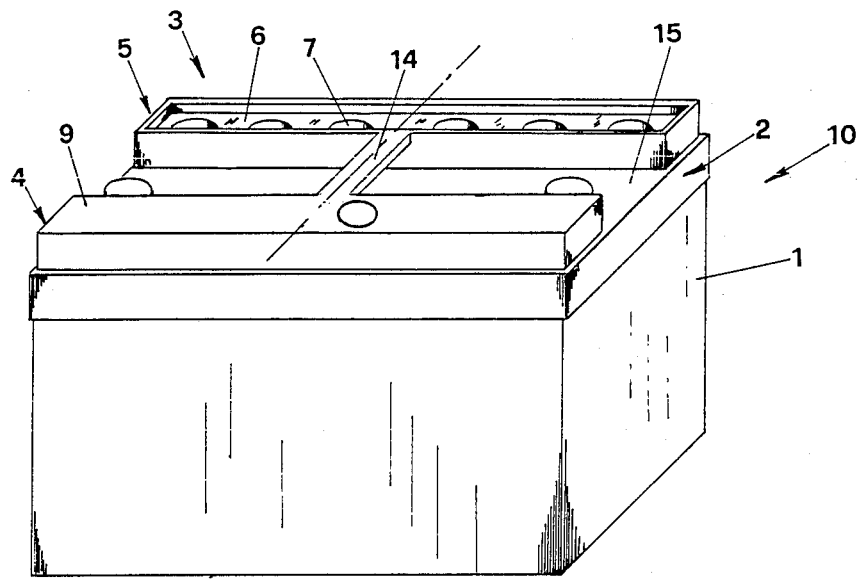
FIG. 1 represents an accumulator battery with the lid according to the invention.
Figure 3:
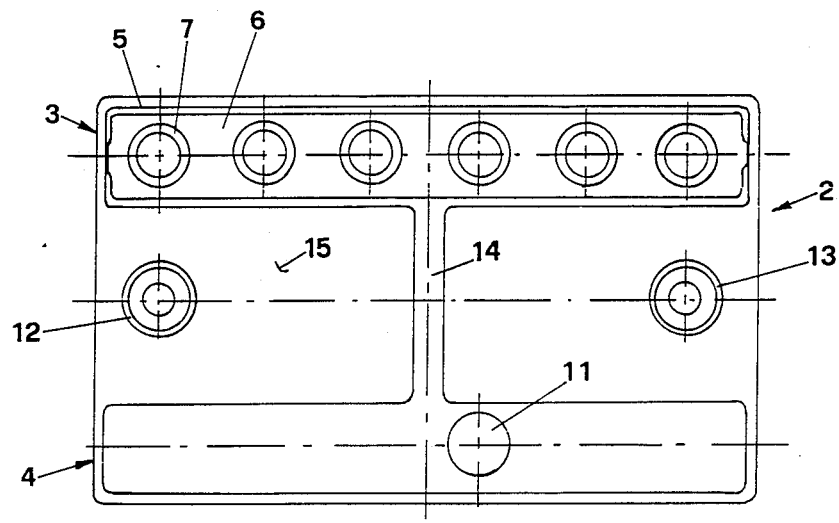
FIG. 3 is a top view of the lid of FIG. 1.
Figure 4:
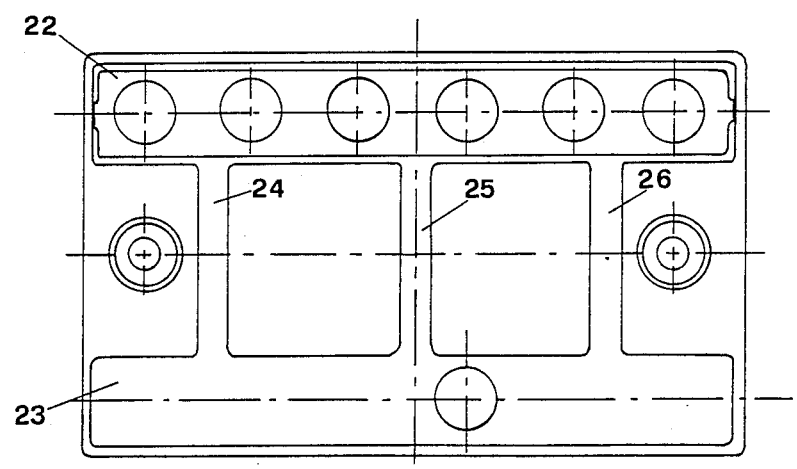
FIG. 4 is a top view of the lid of FIG. 2.

With reference to the mentioned Figures, it can be observed that the battery of FIG. 1, indicated as a whole with 10, presents a container 1 closed at its top by a lid 2. Said lid, as can be observed also with the help of FIG. 3, is moulded of plastic material and presents two parallelepiped elements indicated with 3 and 4. Parallelepiped 3 presents an uninterrupted edge 5 limiting a depressed flat surface 6 wherein there are some holes 7 allowing the fill-up and the re-fill of the electrolyte for each cell or element constituting the battery. On the other hand, parallelepiped 4 presents a flat surface in which there is a hole 11 which serves the purpose of checking the electric charge of the battery.

In the middle of lid 2 there are also the battery poles 12 and 13. The parallelepiped elements 3 and 4 are connected with each other, in the case of the lid represented in FIG. 1, by a transverse piece 14 having a thickness which is smaller than the height of the parallelepiped 4 and of the edge 5 of the parallelepiped 3, so that it is easy for the user to slip his hand in the opening resulting between the bottom of the transverse piece 14 and the underlying surface 15 of the lid. The transverse piece 14, which constitutes the handle, is in the center-of-gravity position and it is directly moulded during the moulding process of lid 2.

It can well be understood that when the user seizes battery 10 by handle 14 with a single hand, he can hold the battery in a balanced position with an obvious advantage both for supporting and transporting the battery.

Figure 2:
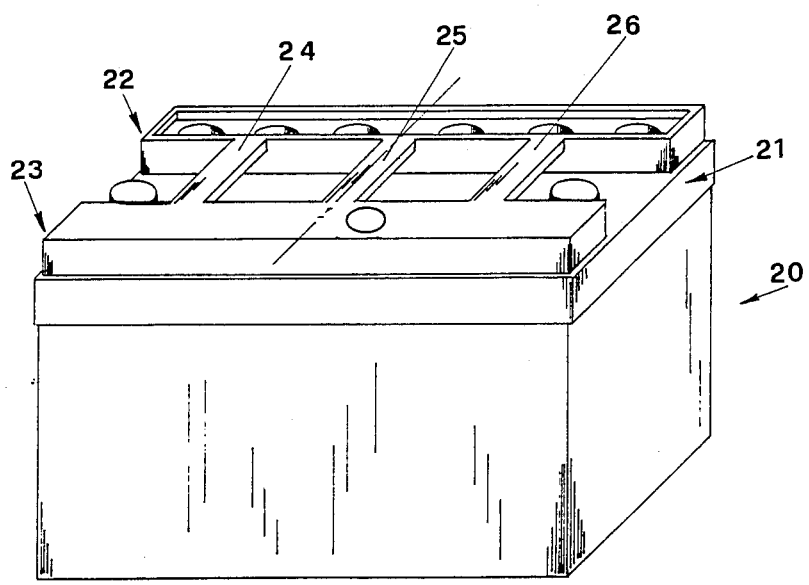
FIG. 2 represents another battery with a variation of the lid according to the invention.

FIG. 2 shows a variation of execution of the lid according to the invention, wherein the transverse pieces joining the parallelepiped elements are three rather than one. More precisely, battery 20 presents a lid 21 wherein there are two parallelepiped elements 22 and 23, which are joined together by three handles 24, 25 and 26 respectively.

The presence of three handles on lid 21, rather than one, allows the choice of lifting the battery with a single hand by seizing the middle handle 25 or with both hands by seizing the lateral handles 24 and 26. In this model, too, the co-planarity of the two parallepiped elements 22 and 23 is insured. Moreover, the volumetric symmetry of said elements insures the equal volume of electrolyte for each cell constituting the battery.

Other construction examples may foresee the manufacture of a lid with two handles rather than with three or one, which would be obtained in any case by direct moulding on the lid and would be included within the overall dimensions of the lid itself.

I claim:

1. A lid for accumulator batteries made of plastic material, characterized in that it comprises at least two parallelepiped elements obtained with the single moulding of the lid, having an equal height and being positioned parallel with each other along the longer sides of the battery, wherein one of said elements presents the holes for the re-fill of the cells and wherein said parallelepiped elements are joined together by at least one transverse piece functioning as a handle made in a single moulding process together with the lid.

2. A lid according to claim 1, characterized in that the parallelepiped elements being present in the lid form a horizontal bearing surface, further characterized in that each volume section of the lid overlying each cell of the battery is the same.

* * * * *